Aug. 22, 1933. H. BENIT 1,924,056
STRAIN INSULATOR CHAIN
Filed Jan. 27, 1931
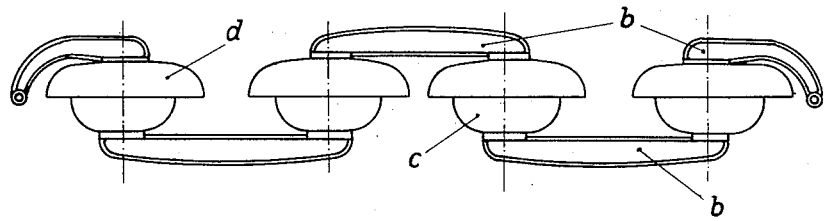
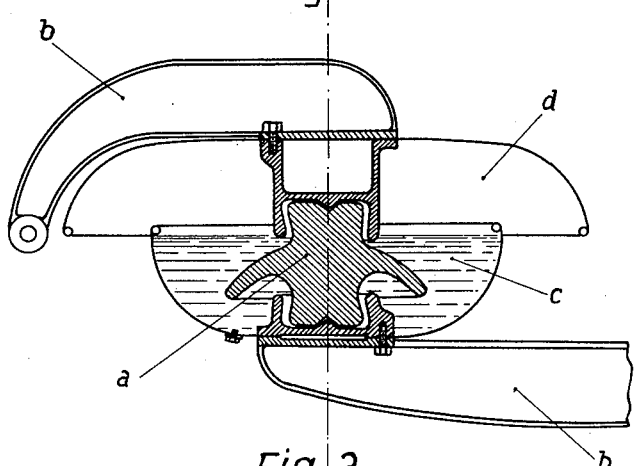
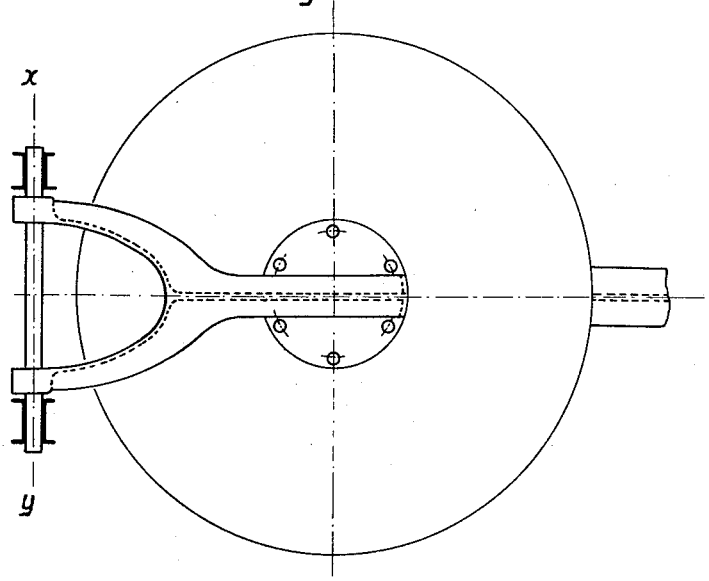
Inventor
Henri Benit
By Marion & Marion
Attorneys Patented Aug. 22, 1933

1,924,056

UNITED STATES PATENT OFFICE 1,924,056

STRAIN INSULATOR CHAIN

Henri Benit, Paris, France

Application January 27, 1931, Serial No. 511,565, and in Germany January 28, 1930

1 Claim. (Cl. 173—318)

The chains of insulators usually employed for horizontal anchorages are constituted by insulators joined together by means of feebly rigid couplings allowing a certain amount of pivoting to such an extent that the position of these insulators varies considerably, and this prohibits the use of oil insulation in such cases as shore lines.

The chain of insulators, forming the object of the present invention, allows the use of oil cups. It is characterized in this that the coupling members between the insulators rigidly and alternately unite the upper portions and the lower portions of these insulators and that the elements of the chain are insulators of the insulating stem type with caps at both extremities.

Fig. 1 shows one embodiment of the invention.

Fig. 2 represents in sectional elevation one element of the chain.

Fig. 3 represents a plan-view of an element of the chain.

The insulators $a$ are joined together by means of rigid bridge-pieces $b$, coupling alternately the lower caps and the upper caps. In the embodiment shown these bridge-pieces are given a T cross-section so as to prevent deformation by bending or torsion. Their extremities are provided with circular seatings which fit the extremities of the caps to which they are fixed by means of screws.

The chain of four elements represented thus constitute a rigid whole capable of pivoting only about the axis $x$ $y$ of the end coupling which is articulated on the cross-arm of the pole not shown on the drawing, the opposite end coupling being connected to the wire or cable of the line. The insulators can thus be provided with oil cups $c$, petticoats $d$ protecting the oil against weather effects.

The device forming the object of this invention has the advantage of permitting the provision of oil cups on horizontal anchorage chains with any type of insulator-support, or suspension insulator, on condition that these present a sufficiently high resistance.

Having now particularly described and ascertained the nature of my said invention and in what manner the same is to be performed, I declare that what I claim is:

Strain insulator chain for horizontal traction, comprising vertical-axis insulators having oil filled cups the axis of symmetry of which coincides with that of the insulators, said cups creating a horizontal leakage path for the said insulators at the oil surface, and connecting members rigidly securing the insulators together, said connecting members being substantially rectilinear, disposed in parallel relation to the axis of the insulator chain and connecting alternatively the upper extremities and the lower extremities of adjacent insulators.

HENRI BENIT.